(12) United States Patent
Kraft et al.

(10) Patent No.: US 9,672,665 B1
(45) Date of Patent: Jun. 6, 2017

(54) VEHICLE DIAGNOSTICS

(71) Applicant: Allstate Insurance Company, Northbrook, IL (US)

(72) Inventors: Daniel Kraft, Libertyville, IL (US); Jenny Sankovsky, Hawthorn Woods, IL (US); Howard Hayes, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/836,473

(22) Filed: Aug. 26, 2015

Related U.S. Application Data

(60) Provisional application No. 62/043,368, filed on Aug. 28, 2014.

(51) Int. Cl.
| | | |
|---|---|---|
| *G01M 17/00* | (2006.01) | |
| *G07C 5/00* | (2006.01) | |
| *G07C 5/08* | (2006.01) | |
| *G07C 5/02* | (2006.01) | |
| *G06Q 40/08* | (2012.01) | |

(52) U.S. Cl.
CPC ............. *G07C 5/006* (2013.01); *G06Q 40/08* (2013.01); *G07C 5/02* (2013.01); *G07C 5/085* (2013.01); *G07C 5/0808* (2013.01); *G07C 5/0816* (2013.01)

(58) Field of Classification Search
CPC ........ G07C 5/006; G07C 5/02; G07C 5/0808; G07C 5/0816; G07C 5/085; G06Q 40/08
USPC ......... 701/1, 29.1, 29.3, 29.4; 705/2, 4, 347; 455/7, 422.1
See application file for complete search history.

(56) References Cited

U.S. PATENT DOCUMENTS

| | | | |
|---|---|---|---|
| 8,731,768 B2 | 5/2014 | Fernandes et al. | |
| 2004/0054918 A1* | 3/2004 | Duri ..................... | G06Q 20/382 726/1 |

(Continued)

FOREIGN PATENT DOCUMENTS

| | | |
|---|---|---|
| CN | 102830690 A | 12/2012 |
| CN | 102938781 A | 2/2013 |

(Continued)

OTHER PUBLICATIONS

Texas State Vehicle Management Plan, Office of the Comptroller, Developed by the Office of Vehicle Fleet Management, Texas Procurement and Support Services Comptroller of Public Accounts, May 2010, 43 pages.

(Continued)

*Primary Examiner* — Shardul Patel
(74) *Attorney, Agent, or Firm* — Banner & Witcoff, Ltd.

(57) ABSTRACT

Computing systems for vehicle diagnostics are provided. In accordance with some aspects, a computing system may receive, from a vehicle (e.g., from a computing device installed in and/or at the vehicle), a diagnostic code generated by an on-board diagnostic (OBD) system of the vehicle. The computing system may determine an issue with the vehicle based on the diagnostic code and may determine, based on the issue, a remedial action for addressing the issue and a timeframe for performing the remedial action. The computing system may store data identifying the issue, the remedial action, and the timeframe in a record associated with the vehicle.

19 Claims, 5 Drawing Sheets

(56) References Cited

U.S. PATENT DOCUMENTS

| | | | |
|---|---|---|---|
| 2004/0162064 A1* | 8/2004 | Himmelstein | G06Q 10/10 455/422.1 |
| 2004/0172304 A1* | 9/2004 | Joao | G06Q 40/02 705/2 |
| 2005/0273368 A1* | 12/2005 | Hutten | G06Q 40/08 705/4 |
| 2007/0088472 A1 | 4/2007 | Ganzhorn et al. | |
| 2009/0248235 A1 | 10/2009 | Hering et al. | |
| 2010/0088123 A1* | 4/2010 | McCall | G06Q 40/08 705/4 |
| 2010/0138242 A1* | 6/2010 | Ferrick | G06Q 10/087 705/4 |
| 2011/0009107 A1 | 1/2011 | Guba et al. | |
| 2011/0264472 A1* | 10/2011 | Mostelac | G06Q 40/00 705/4 |
| 2012/0053759 A1 | 3/2012 | Lowrey et al. | |
| 2012/0136802 A1* | 5/2012 | McQuade | G06Q 30/0282 705/347 |
| 2013/0065512 A1* | 3/2013 | Gunnarsson | H04B 7/155 455/7 |
| 2013/0066512 A1 | 3/2013 | Willard et al. | |
| 2013/0246135 A1* | 9/2013 | Wang | G07C 5/008 705/14.4 |
| 2013/0317665 A1* | 11/2013 | Fernandes | G08G 5/0039 701/1 |
| 2014/0052531 A1 | 2/2014 | Kent et al. | |
| 2014/0058618 A1 | 2/2014 | Rude et al. | |
| 2014/0099607 A1* | 4/2014 | Armitage | B60W 40/09 434/66 |
| 2014/0107886 A1 | 4/2014 | Miljkovic et al. | |
| 2014/0195098 A1* | 7/2014 | Lorenz | G06F 17/00 701/29.3 |
| 2015/0094877 A1* | 4/2015 | Tahnoose | G07C 5/008 701/1 |
| 2015/0170287 A1* | 6/2015 | Tirone | G06Q 40/08 705/4 |

FOREIGN PATENT DOCUMENTS

| | | |
|---|---|---|
| CN | 103699108 A | 4/2014 |
| KR | 20050083530 A | 8/2005 |

OTHER PUBLICATIONS

OSHAcademy Course 719 Study Guide, Fleet Safety Management, Copyright 2013 Geigle Safety Group, Inc., 41 pages.

Chapter 3 Fleet Loss Control Measures, the State Office of Risk Management, RMTSA vol. II, Section Two, Chapter Three, Section Two—Fleet Safety Program Chapter 3, Revised: Dec. 2004, https://www.sorm.state.tx.us/rmtsa-guidelines-2/rmtsa-introduction/rmtsa-volume-two-table-of-contents/rmtsa-vol-ii-section-two-chapter-three, 10 pages.

Total Car Diagnostics Support, Complete List of OBD Codes: Generic OBD2 (OBDII) & Manufacturer Car OBD Diagnostics, ECU Chip Tuning & Auto Repair Support, http://www.totalcardiagnostics.com/support/Knowledgebase/Article/View/21/0/genericmanufacturer-obd2-codes-and-their-meanings, posted by Alex (Im) E. on Jan. 29, 2013 07:25PM, May 11, 2015, 39 pages.

New York Department of Motor Vehicles, Motor Vehicle Inspection Regulations, Effective Jun. 19, 2013, CR-79 (3/15), www.dmv.ny.gov, 101 pages.

Vermont Periodic Inspection Manual, State of Vermont, Department of Motor Vehicles, Montpelier, VT, dmv.vermont.gov, 310 pages.

Virginia Department of Motor Vehicles Commercial Motor Vehicle Inspection Requirements, www.dmvNow.com, DMV 241E (Nov. 13, 2014) Copyright Commonwealth of Virginia Department of Motor Vehicles (DMV) 2014, 2 pages.

ON-Board Diagnostic Trouble Codes (DTCs), 11 pages.

EVIR: Electronic Vehicle Inspection Report, Zonar Systems, May 11, 2015, Copyright 2015 Zonar Systems, http://www.zonarsystems.com/products/eyir-vehicle-inspection, 2 pages.

West Virginia State Police General Inspection Requirements, State Agency Directory Online Services, http://www.wvsp.gov/trafficSafety/Pages/GeneralInspectionRequirements.aspx, May 11, 2015, 2 pages.

GSA Fleet Vehicle Guide 2014, U.S. General Services Administration, Guide to Your Fleet Vehicle, www.gsa.gov, 36 pages.

Maine Motor Vehicle Inspection Manual, revised Dec. 15, 2006, 214 pages.

Massachusetts Vehicle Check, Apr. 17, 2015, http://www.vehicletest.state.ma.us/about_whywhat.html#safetytests, 6 pages.

New Hampshire Division of Motor Vehicles, Minimum Requirements, Inspection Stations, Registration, copyright 2012 State of New Hampshire, 4 pages.

Mississippi Board of Trustees of State Institutions of Higher Learning, Motor Vehicle and Fleet Management Best Practice Guidelines, , 27 pages.

Massachusetts Vehicle Check, http://www.vehicletest.state.ma.us/motorist_basicinfo.htmlApr. 17, 2015, 3 pages.

Pennsylvania Department of Transportation, PennDOT Driver and Vehicle Services, Vehicle Safety Inspections, Station Owners/Mechanics FAQs, http://www.dmv.state.pa.us/inspections/safety_stationmech_faq.shtml, May 11, 2015, 4 pages.

Vecchione Fleet & Tire, The Basics Behind Safety Inspection Services at Vecchnione Fleet & Tire, http://www.vectire.com/services/vehicle-inspection/safety-inspection.aspx, May 11, 2015, 2 pages.

Aug. 5, 2016—(US) Notice of Allowance—U.S. Appl. No. 14/836,514.

"Technology and Application for Cooperation between EV Network Design and Remote Diagnostic Service", Li-Chun Luo et al, R&D Division Testing, Automotive Research and Testing Center, retrieved Jun. 6, 2014.

"Remote Diagnostics", Risk Technology: Tomorrow's Driving Technology Today, Apr. 30, 2014, <http://www.risk-technology.com.uk/by-invitation>.

"Airmax Remote (RVD)", Airmax Group, 2014, <http://www.airmaxgroup.com/index.php/com>.

"System for Remote Diagnostic of Vehicle Defects", Lejla Ferhatovic et al., 17th Telecommunications forum TELFOR 2009, Nov. 24, 2009.

"Remote Engine Diagnostics", Reltronics Technologies, 2009, <http://www.reltronicstech.com/Remote_Engine_Diagnostics.html>.

"China: Delphi launches OBD-based Connected Car Solution", Telematics News, Oct. 15, 2013, http://telematicsnews.info/2013/10/15/04153/>.

\* cited by examiner ived systems and can trigger
VEHICLE DIAGNOSTICS

This application claims priority to and the benefit of Provisional Application U.S. Ser. No. 62/043,368, filed Aug. 28, 2014, which is incorporated herein by reference in its entirety.

BACKGROUND

Many modern vehicles include an on-board diagnostic (OBD) system. An OBD system receives data from sensors located in various areas of the vehicle and can trigger indicators (e.g., dashboard lights) to warn an operator of the vehicle of potentially dangerous or problematic conditions. While these indicators may notify an operator of the existence of a condition, they are often vague and fail to provide the operator with adequate information for addressing the condition. Typically, such indicators merely convey to the operator that they should service the vehicle. In such cases, in order to obtain additional information regarding the condition, the operator may be required to have the vehicle serviced by a qualified service provider (e.g., a dealer) with equipment capable of interpreting diagnostic codes generated by the OBD system.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more examples, a computing system may receive, from a vehicle (e.g., from a vehicle-management computing device installed on or otherwise affixed to the vehicle), a diagnostic code generated by an on-board diagnostic (OBD) system of the vehicle. The computing system may determine an issue with the vehicle based on the diagnostic code and may determine, based on the issue, a remedial action for addressing the issue and a timeframe for performing the remedial action. The computing system may store data identifying the issue, the remedial action, and the timeframe in a record associated with the vehicle.

In accordance with one or more examples, a computing system may include a vehicle having one or more monitored vehicle systems and a computing device configured to at least monitor an operation of the vehicle systems. The computing device may receive, from the vehicle (e.g., from a vehicle-management computing device installed on or otherwise affixed to the vehicle), at least one signal (e.g., from one or more sensors monitoring the operation of each of a plurality of vehicle systems, where the signal may correspond to a status of a vehicle component). In some cases, the computing device may additionally, or alternatively, receive a diagnostic code generated by an on-board diagnostic (OBD) system of the vehicle. The computing system may predict when an issue with the vehicle is likely to occur based on the at least one signal and/or the diagnostic code and may determine, based on the issue, a remedial action for addressing the issue and a timeframe for performing the remedial action. The computing system may store data identifying the issue, the remedial action, and the timeframe in a record associated with the vehicle.

In some cases, a vehicle system management device may include a first communication interface configured for wired or wireless communication to a remote computing system, such as via a wireless communication network (e.g., a cellular communication link, a WiFi communication link, a wide area network (WAN) communication link, etc.) and a second communication network configured to communicate to at least one vehicle monitoring device within the vehicle via a wired (e.g., an onboard diagnostic (OBD) communication link, etc.) or a wireless (e.g., a Bluetooth communication link, a wireless LAN link, etc.) communication network. The system may further include an analysis engine having a processor configured to execute instructions stored in a memory device. The analysis engine may receive status information corresponding to an operation of a component of the at least one vehicle system and analyze the status information to determine a current status of the at least one vehicle system. Based on the analysis of the status information, the analysis engine may predict a future status corresponding to the at least one vehicle system and transmit the future status information to a user interface device.

In some cases, a vehicle management system may include a vehicle, a computing device communicatively coupled to one or more vehicle systems, and a mobile device configured to analyze vehicle system status information. In some cases, the vehicle may include an onboard diagnostic (OBD) system and/or a plurality of sensors additional to the OBD system configured to monitor a plurality of vehicle systems. The computing device may include a first communication interface communicatively coupled to the OBD system and to the plurality of sensors. The computing device may be configured to receive vehicle system status information from the OBD system and the plurality of sensors. In some cases, the system status information may include at least one of a diagnostic message received from the OBD system corresponding to at least one of the plurality of vehicle systems, and a signal from the plurality of sensors corresponding to a state of at least one system of the plurality of vehicle systems. In some cases, the computing device may further include a second communication interface communicatively coupled to the mobile device, where the mobile device may be associated with a user of the vehicle. In some cases, the mobile device may communicate to the computing device via a wired or wireless network, such as a WAN (e.g., a cellular communications network, etc.) or a LAN (e.g., a Bluetooth network). The mobile device may include a user interface device and an analysis engine comprising a processor configured to process instructions stored in a memory device. The analysis engine may identify vehicle information based on vehicle insurance information received from a remote computing system, analyze the vehicle system status information based, at least in part, on the vehicle insurance information to predict whether a remedial action is to be used to correct a future system status, present, via the user interface device, the vehicle system status information and a predicted remedial action to the user, and receive, via the user interface device, a user input specifying whether to proceed with the predicted remedial action.

In some examples, the computing system may identify an auto-insurance policy associated with the vehicle, for example, based on an identifier associated with the vehicle (e.g., an identifier received from the vehicle-management computing device).

In some examples, the computing system may generate a notification identifying the issue, the remedial action, and/or the timeframe. In some cases, a notification concerning one vehicle associated with a household may be communicated to other users associated with the household and/or the insurance policy. Similarly, a notification concerning one vehicle associated with a business may be communicated to other users associated with the business and/or the insurance policy. In such embodiments, the computing system may identify (e.g., based on the auto-insurance policy and/or the identifier associated with the vehicle) a personal computing device associated with the vehicle and may communicate the notification to the personal computing device.

In some examples, the computing system may identify (e.g., based on a storage address of the vehicle indicated by the auto-insurance policy) one or more service locations equipped to perform the remedial action, and the notification may identify the service location(s). In such embodiments, the computing system may identify (e.g., based on the auto-insurance policy) one or more discounts available to holders of the auto-insurance policy at the service location(s) and the notification may identify the discount(s). Additionally or alternatively, the computing system may identify (e.g., based on the storage address) a cost estimate for the remedial action and the notification may include the cost estimate.

In some examples, the computing system may determine the issue, the remedial action, and/or the timeframe, based on information indicated by the auto-insurance policy. For example, the diagnostic code may be specific to a make and model of the vehicle and the computing system may determine the issue, the remedial action, and/or the timeframe, based on a make and model of the vehicle indicated by the auto-insurance policy. Additionally or alternatively, the computing system may determine the issue, the remedial action, and/or the timeframe, based on information from one or more claims previously filed under the auto-insurance policy.

In some examples, the computing system may determine (e.g., based on a make and model of the vehicle indicated by the auto-insurance policy) that the issue is associated with a recall issued by a manufacturer of the vehicle and the notification may indicate that the issue is associated with the recall. Additionally or alternatively, the computing system may determine (e.g., based on the make and model of the vehicle) that the issue is covered by a warranty on the vehicle and the notification may indicate that the issue is covered by the warranty. In other embodiments, the computing system may determine (e.g., based on the make and model of the vehicle) that the issue is not covered by a warranty on the vehicle. In such embodiments, the computing system may identify (e.g., based on the make and model) an extended-coverage warranty that would have covered the issue and the notification may identify the extended-coverage warranty.

In some examples, the timeframe may indicate that the remedial action should be performed immediately. In such embodiments, the computing system may determine that the auto-insurance policy covers roadside assistance and the notification may indicate that the remedial action should be performed immediately and/or that the auto-insurance policy covers roadside assistance.

In some examples, the computing system may receive (e.g., from the vehicle-management computing device) an odometer reading for the vehicle. In such embodiments, the computing system may determine (e.g., based on the odometer reading and/or the make and model of the vehicle) that the vehicle is due for scheduled maintenance. The computing system may generate a reminder regarding the scheduled maintenance and may communicate the reminder to the personal computing device associated with the vehicle. Additionally or alternatively, the computing system may identify a maintenance history for the vehicle and may communicate at least a portion of the maintenance history to the personal computing device associated with the vehicle.

In some examples, the computing system may continue to monitor the vehicle to determine whether the remedial action was performed within the timeframe. In such embodiments, responsive to a determination that the remedial action was performed within the timeframe, the computing system may modify the auto-insurance policy (e.g., apply a discount to a premium of the auto-insurance policy). Additionally or alternatively, the computing system may determine (e.g., based on whether the remedial action was performed within the timeframe) a renewal premium, new deductible, discount, or other incentive for the auto-insurance policy.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
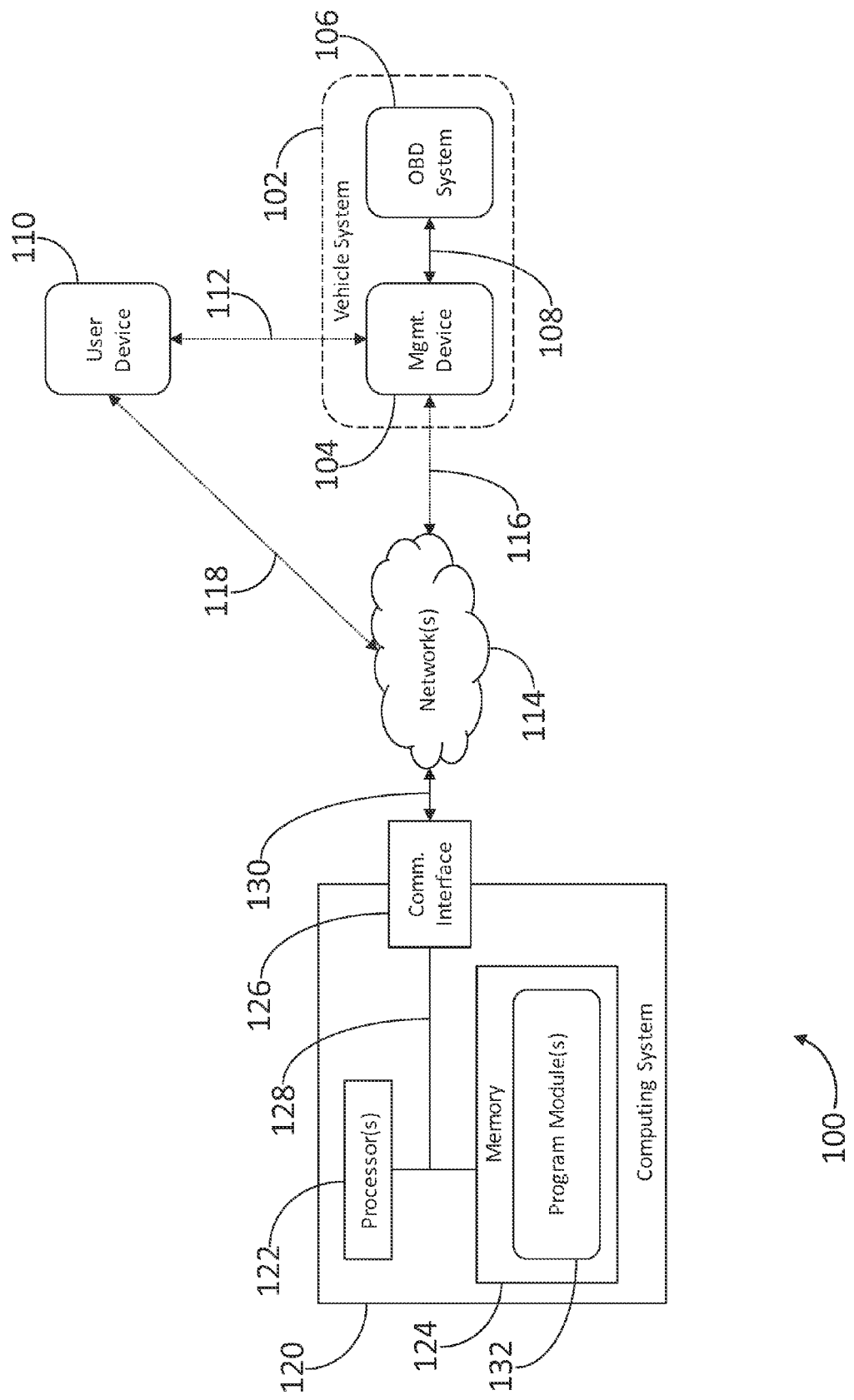
FIG. 1 depicts an illustrative computing environment in accordance with one or more illustrative embodiments.

FIG. 1 depicts an illustrative computing environment in accordance with one or more example embodiments. Referring to FIG. 1, computing environment 100 may include vehicle system 102. Vehicle system 102 may include one or more computing devices associated with (e.g., installed at or affixed to) a vehicle (e.g., an automobile, car, truck, bus, or the like). For example, vehicle system 102 may include management device 104 and/or on-board diagnostic (OBD) system 106. OBD system 106 may be configured to receive data from one or more sensors located in various areas of the vehicle and/or to utilize such data to generate one or more diagnostic codes corresponding to vehicle conditions. Interface 108 may interface OBD system 106 and management device 104 and may support intercommunication between OBD system 106 and management device 104. Management device 104 may be any type of computing device configured to receive (e.g., via interface 108) one or more diagnostic codes generated by OBD system 106. In some embodiments, management device 104 may be configured to process telematics data for the vehicle and/or to generate or communicate telematics data for the vehicle. Computing environment 100 may also include user device 110. User device 110 may be a personal computing device (e.g., desktop computer, laptop computer, tablet computer, smart phone, personal media device, or the like) associated with vehicle system 102 (e.g., a personal computing device associated with an owner and/or operator of the vehicle associated with vehicle system 102). In some embodiments, communication link 112 may support direct, wireless intercommunication between user device 110 and management device 104. For example, communication link 112 may be a BLUETOOTH communication link.

Computing environment 100 may also include network(s) 114, which may include one or more sub-networks (e.g., local area networks (LANs), wide area networks (WANs), virtual private networks (VPNs), or the like). Communication link 116 may support wireless intercommunication between network(s) 114 and management device 104. Similarly, communication link 118 may support wireless intercommunication between network(s) 114 and user device 110. For example, communication link 116 and/or communication link 118 may include one or more cellular, WIFI, or WIMAX communication links, or the like.

Computing environment 100 may also include computing system 120. Computing system 120 may include one or more of any type of computing device (e.g., desktop computer, laptop computer, tablet computer, smart phone, server, server blade, mainframe, virtual machine, or the like) configured to perform one or more of the functions described herein. In some embodiments, computing system 120 may include one or more of user device 110, management device 104, and/or OBD system 106. Computing system 120 may be associated with an organization. For example, computing system 120 may be associated with an organization that provides auto-insurance coverage for the vehicle associated with vehicle system 102 and/or utilizes telematics data for the vehicle associated with vehicle system 102. Computing system 120 may include one or more processor(s) 122, memory 124, communication interface 126, and/or data bus 128. Data bus 128 may interconnect processor(s) 122, memory 124, and/or communication interface 126. Communication interface 126 may be a network interface configured to support communication between computing system 120 and network(s) 114 (or one or more sub-networks thereof) via communication link 130. Memory 124 may include one or more program modules comprising instructions that when executed by processor(s) 122 cause computing system 120 to perform one or more functions described herein. For example, memory 124 may include program module(s) 132, which may comprise instructions that when executed by processor(s) 122 cause computing system 120 to perform one or more functions described herein.

Figure 2:
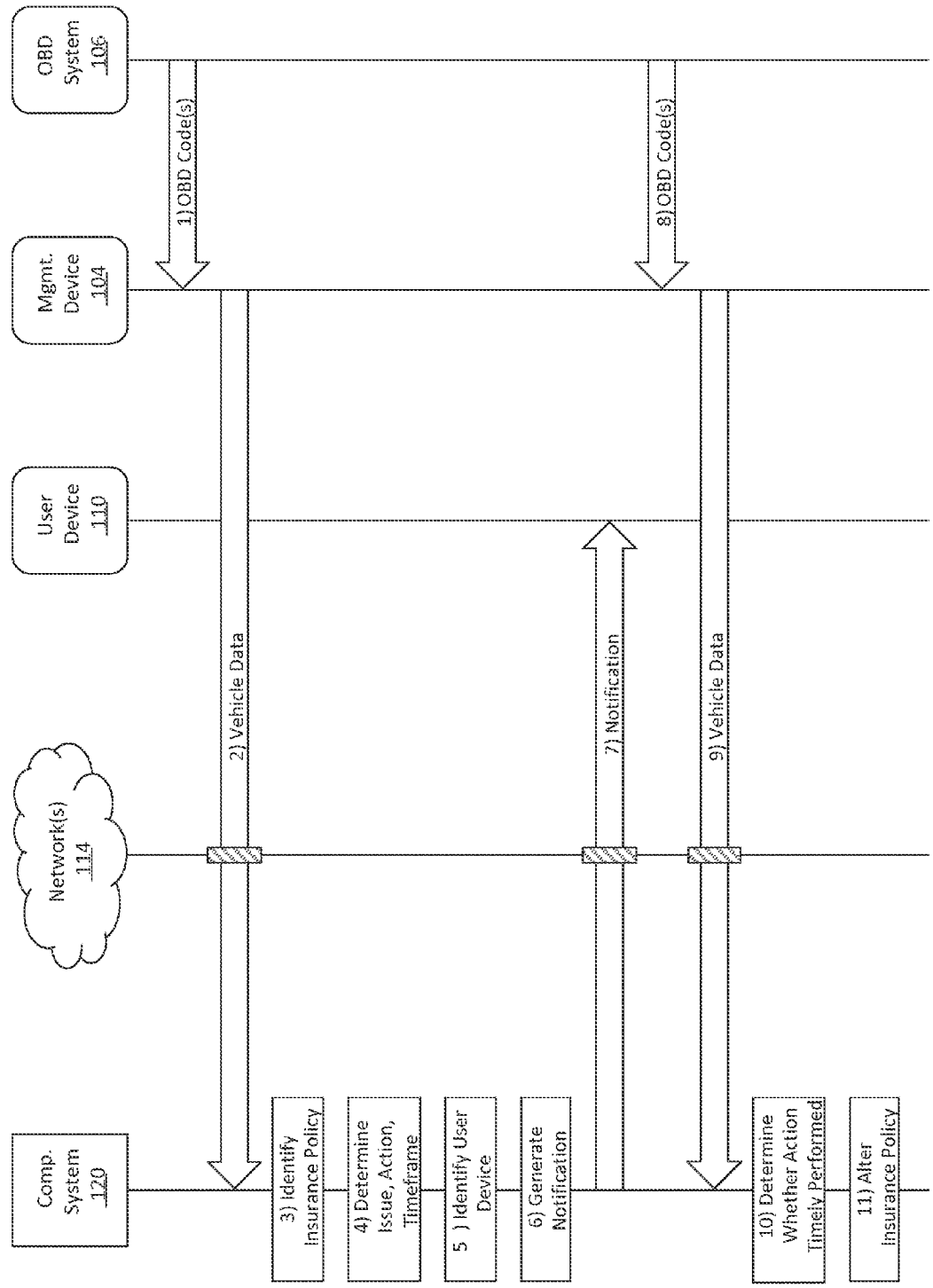
FIG. 2 depicts an illustrative event sequence in accordance with one or more illustrative embodiments.

FIG. 2 depicts an illustrative event sequence in accordance with one or more example embodiments. Referring to FIG. 2, at step 1, OBD system 106 may communicate one or more diagnostic codes to management device 104. At step 2, management device 104 may communicate (e.g., via network(s) 114) vehicle data to computing system 120. In some embodiments, management device 104 may communicate the vehicle data (or a portion thereof) via communication links 116 and 130. Additionally or alternatively, management device 104 may communicate the vehicle data (or a portion thereof) via communication links 112, 118, and 130 (e.g., via user device 110). The vehicle data may include a vehicle identifier (e.g., an identifier corresponding to the vehicle associated with vehicle system 102), the diagnostic code(s), and/or other data (e.g., an odometer reading, telematics data, or the like). Computing system 120 may receive (e.g., via communication interface 126) the vehicle data. At step 3, computing system 120 may identify (e.g., based on the vehicle identifier) an auto-insurance policy associated with the vehicle.

At step 4, computing system 120 may determine that there is an issue with the vehicle. For example, computing system 120 may determine that there is an issue with the vehicle based on the diagnostic code(s). Additionally or alternatively, computing system 120 may determine that the vehicle is due for scheduled maintenance (e.g., based on the odometer reading). In some embodiments, computing system 120 may determine the issue based on information indicated by the auto-insurance policy. For example, the diagnostic code(s) may be specific to a make, model, and/or year of the vehicle and computing system 120 may determine the issue based on a make, model, and/or year of the vehicle indicated by the auto-insurance policy, along with additional vehicle information such as, a trim level, feature packages, or the like, of the vehicle. Additionally or alternatively, computing system 120 may determine the issue based on information from one or more claims previously filed under the auto-insurance policy. For example, the claim(s) may include information regarding maintenance previously performed on the vehicle, and computing system 120 may determine the issue based on the information regarding the maintenance previously performed on the vehicle and/or the diagnostic code(s). In some embodiments, computing system 120 may determine that the vehicle is due for scheduled maintenance based on information indicated by the auto-insurance policy. For example, the auto-insurance policy may indicate a make and model of the vehicle, and computing system 120 may utilize the make and model of the vehicle indicated by the auto-insurance policy to identify a maintenance schedule for the vehicle and may determine that the vehicle is due for scheduled maintenance (e.g., based on the maintenance schedule for the vehicle and/or the odometer reading). Computing system 120 may determine, based on the issue, a remedial action for addressing the issue (e.g., a recommended maintenance or service to address the issue) and a timeframe for performing the remedial action (e.g., a recommended timeframe for performing the recommended maintenance or service to address the issue).

In some embodiments, computing system 120 may determine the remedial action based on information indicated by the auto-insurance policy (e.g., coverage types, limits, deductibles, or the like). For example, computing system 120 may determine a different remedial action for two different vehicles of the same make, model, and/or year that are covered by auto-insurance policies having different terms (e.g., coverage types, limits, deductibles, or the like). In some embodiments, computing system 120 may determine the timeframe based on information indicated by the auto-insurance policy (e.g., an amount of time and/or mileage remaining on a warranty of the vehicle, and/or an amount of time remaining on the auto-insurance policy). Additionally or alternatively, computing system 120 may determine the timeframe based on the location of the vehicle (e.g., based on global positioning system (GPS) data received from vehicle system 102 and/or user device 110), the urgency of the issue, and/or the distance to a service provider available to perform the remedial action. For example, computing system 120 may determine that the issue is not urgent and that the vehicle is currently located a great distance from its storage address (e.g., as indicated by the auto-insurance policy) and/or an available service provider, and computing system 120 may determine a timeframe that is greater than a timeframe that might otherwise be determined for the issue (e.g., if the vehicle were currently located near the storage address and/or an available service provide). In some embodiments, computing system 120 may determine that available service providers (e.g., in the storage location of the vehicle and/or near the current location of the vehicle) are not currently available to perform the remedial action, and computing system 120 may determine a timeframe that is greater than a timeframe that might otherwise be determined (e.g., if the service providers were currently available to perform the remedial action). Additionally or alternatively, computing system 120 may determine multiple timeframes for performing the remedial action. For example, computing system 120 may determine multiple timeframes for performing the remedial action and may assign different incentives (e.g., incentives associated with the auto-insurance policy) to each of the multiple timeframes (e.g., better incentives for performing the remedial action within a shorter timeframe). Computing system 120 may store (e.g., in memory 124) data identifying the issue, the remedial action, and the timeframe in a record associated with the vehicle (e.g., in a record associated with the auto-insurance policy).

At step 5, computing system 120 may identify a personal computing device associated with the vehicle. For example, computing system 120 may identify user device 110 (e.g., based on the auto-insurance policy and/or the vehicle identifier). At step 6, computing system 120 may generate a notification to one or more users of the vehicle and/or individuals associated with the insurance policy (e.g., members of a household, employees of a business, etc.). For example, if computing system 120 determined (e.g., in step 4) that the vehicle is due for scheduled maintenance, computing system 120 may generate a reminder regarding the scheduled maintenance. Additionally or alternatively, if computing system 120 determined (e.g., based on the diagnostic code(s)) an issue with the vehicle (e.g., in step 4), computing system 120 may generate a notification identifying the issue, the remedial action, and/or the timeframe. In some embodiments, computing system 120 may identify a maintenance history for the vehicle and the notification may comprise at least a portion of the maintenance history. In some embodiments, computing system 120 may identify an individual designated (e.g., by the auto-insurance policy) to receive such notifications for the vehicle, for example, a particular member of a household associated with the vehicle may be designated to receive such notifications. In some embodiments, computing system 120 may generate a message (e.g., a message configured for an application executing on user device 110, a text message such as, a short message service (SMS) message, a multimedia messaging service (MMS) message, etc., an email, or the like), that includes the notification. Additionally or alternatively, computing system 120 may generate (e.g., based on a preference indicated in the auto-insurance policy) a record indicating that another form of notification should be utilized (e.g., a postcard, or the like).

In some embodiments, computing system 120 may identify, for example, based on a current location of the vehicle (e.g., based on GPS data received from vehicle system 102 and/or user device 110) and/or a storage address (e.g., work, home, or the like) of the vehicle indicated by the auto-insurance policy, one or more service locations equipped to perform the remedial action, and the notification may identify the service location(s). In such embodiments, computing system 120 may identify (e.g., based on the auto-insurance policy) one or more discounts available to holders of the auto-insurance policy at the service location(s) and the notification may identify the discount(s). Additionally or alternatively, computing system 120 may identify (e.g., based on the storage address) a cost estimate for the remedial action and the notification may include the cost estimate. In some embodiments, computing system 120 may identify one or more incentives (e.g., auto-insurance discounts, or the like) for performing the remedial action with a particular service provider (e.g., a service provider associated with the auto-insurance policy).

In some embodiments, computing system 120 may determine (e.g., based on a make and model of the vehicle indicated by the auto-insurance policy) that the issue is associated with a recall issued by a manufacturer of the vehicle and the notification may indicate that the issue is associated with the recall. Additionally or alternatively, computing system 120 may determine (e.g., based on the make and model of the vehicle) that the issue is covered by a warranty on the vehicle and the notification may indicate that the issue is covered by the warranty. In other embodiments, computing system 120 may determine (e.g., based on the make and model of the vehicle) that the issue is not covered by a warranty on the vehicle. In such embodiments, computing system 120 may identify (e.g., based on the make and model) an extended-coverage warranty that would have covered the issue and the notification may identify the extended-coverage warranty.

In some embodiments, the timeframe may indicate that the remedial action should be performed immediately. In such embodiments, computing system 120 may determine that the auto-insurance policy covers roadside assistance and the notification may indicate that the remedial action should be performed immediately and/or that the auto-insurance policy covers roadside assistance. In some embodiments, computing system 120 may identify (e.g., based on the diagnostic code(s), the make, model, and/or year of the vehicle, and/or the current location of the vehicle) one or more service providers for performing the remedial action (e.g., one or more service providers affiliated with the auto-insurance policy and/or roadside assistance), and the notification may identify the service provider(s). In such embodiments, the notification may include one or more options for selection via user device 110. For example, the notification may include one or more options for declining roadside assistance, confirming a request for roadside assistance (e.g., at the current location), specifying an alternate location for the roadside assistance, selecting a service provider of the identified service provider(s), establishing communication with a roadside assistance representative, and/or establishing communication with a service provider of the identified service provider(s).

At step 7, computing system 120 may communicate (e.g., via communication interface 126, network(s) 114, and communication links 130 and 118) the notification to user device 110. In some cases, the notification may be communicated to the driver of the vehicle. In other cases, the notification may be communicated to one or more other individuals associated with the vehicle and/or insurance policy associated with the vehicle. For example, the computing system 120 may communicate the notification to a user device associated with the driver and/or one or more other individuals associated with the vehicle, such as a family member (e.g., a parent, a guardian, a spouse, another member of the household), or a business associate (e.g., an employer) and/or the like. Additionally or alternatively, computing system 120 may communicate the notification to vehicle system 102 (e.g., to management device 104), for example, for display within the vehicle. In some embodiments, computing system 120 may communicate the notification to one or more other devices (e.g., in addition to or in lieu of user device 110). For example, computing system 120 may identify (e.g., based on the auto-insurance policy) one or more other user devices (not illustrated) and/or one or more other vehicle systems (not illustrated) associated with vehicle system 102, and computing system 120 may communicate the notification to these other device(s), for example, periodically (e.g., at the beginning of each day, trip, or the like) until computing system 102 determines that the remedial action has been performed, or the like.

At step 8, OBD system 106 may communicate one or more diagnostic codes to management device 104. For example, in some embodiments, computing system 120, management device 104, and/or user device 110 may poll (e.g., periodically, at the end of each trip, at the end of the timeframe, or the like) OBD system 106 for one or more diagnostic codes (e.g., diagnostics codes associated with the issue). At step 9, management device 104 may communicate (e.g., via network(s) 114) vehicle data to computing system 120. In some embodiments, management device 104 may communicate the vehicle data (or a portion thereof) via communication links 116 and 130. Additionally or alternatively, management device 104 may communicate the vehicle data (or a portion thereof) via communication links 112, 118, and 130 (e.g., via user device 110). The vehicle data may include a vehicle identifier (e.g., the identifier corresponding to the vehicle associated with vehicle system 102), the diagnostic code(s), and/or other data (e.g., an odometer reading, telematics data, or the like). Computing system 120 may receive (e.g., via communication interface 126) the vehicle data.

At step 10, computing system 120 may determine whether the remedial action and/or the scheduled maintenance were performed within the timeframe (e.g., based on the diagnostic code(s) and/or the odometer reading). At step 11, computing system 120 may alter the auto-insurance policy associated with the vehicle. For example, computing system 120 may determine a new premium, deductible, discount, or the like for the auto-insurance policy associated with the vehicle. In some embodiments, computing system 120 may determine the premium based on whether the remedial action and/or the scheduled maintenance were performed within the timeframe. For example, responsive to a determination that the remedial action and/or the scheduled maintenance were performed within the timeframe, computing system 120 may apply a discount to a premium of the auto-insurance policy (e.g., to encourage timely vehicle maintenance). Additionally or alternatively, computing system 120 may determine (e.g., based on whether the remedial action and/or the scheduled maintenance were performed within the timeframe) a renewal premium for the auto-insurance policy, for example, by using the determination of whether the remedial action and/or the scheduled maintenance were performed within the timeframe as a rating factor in determining the renewal premium.

Figure 3:
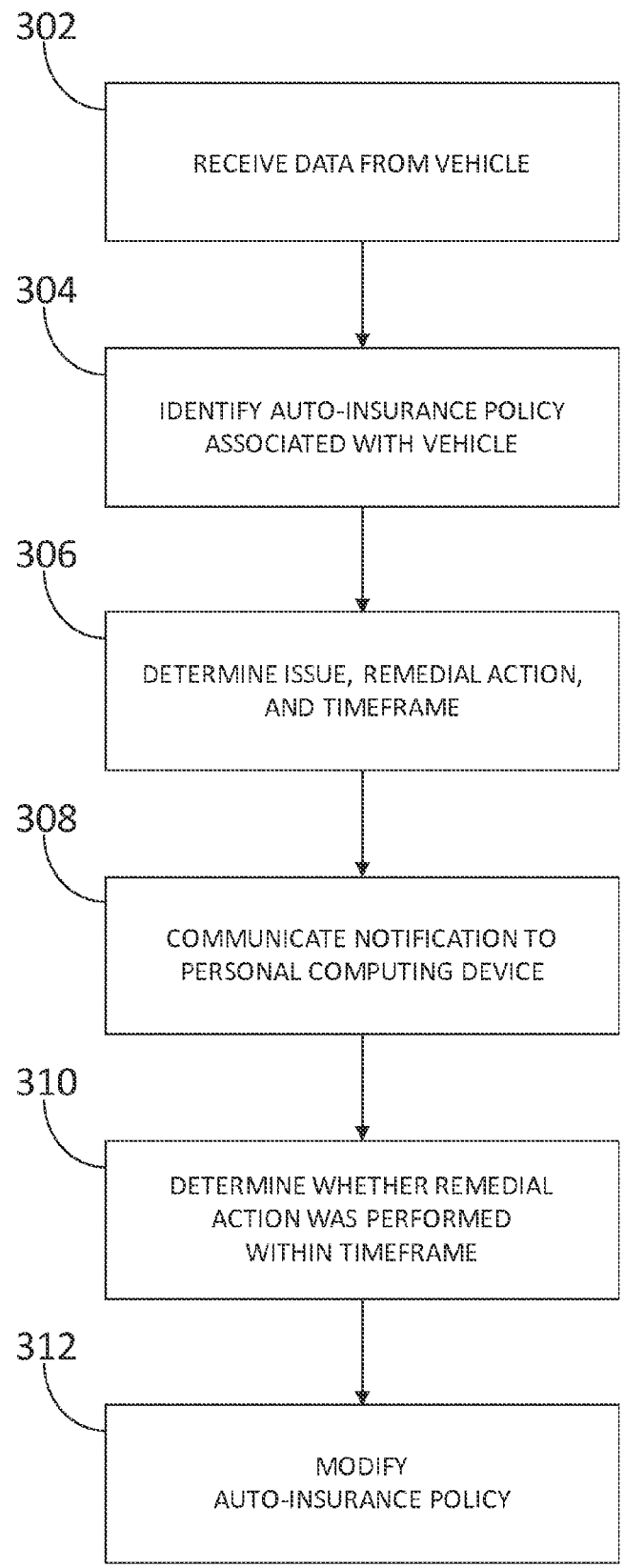
FIG. 3 depicts an illustrative method in accordance with one or more illustrative embodiments.

FIG. 3 depicts an illustrative method in accordance with one or more example embodiments. Referring to FIG. 3, at step 302, data may be received from a vehicle. For example, computing system 120 may receive vehicle data (e.g., a vehicle identifier, one or more diagnostic codes, and/or an odometer reading) from vehicle system 102. At step 304, an auto-insurance policy associated with the vehicle may be identified. For example, computing system 120 may identify (e.g., based on the vehicle identifier) an auto-insurance policy associated with the vehicle associated with vehicle system 102. At step 306, an issue with the vehicle, a remedial action for addressing the issue, and a timeframe for performing the remedial action may be determined. For example, computing system 120 may determine (e.g., based on information from the auto-insurance policy, the diagnostic code(s), and/or the odometer reading) an issue with the vehicle, a remedial action for addressing the issue, and a timeframe for performing the remedial action. At step 308, a notification may be communicated to a personal computing device associated with the vehicle. For example, computing system 120 may generate a notification identifying the issue, the remedial action, and the timeframe, and may communicate the notification to user device 110. At step 310, a determination of whether the remedial action was performed within the timeframe may be made. For example, computing system 120 may determine (e.g., based on new vehicle data received from vehicle system 102) whether the remedial action was performed within the timeframe. At step 312, the auto-insurance policy may be modified. For example, computing system 120 may determine a new premium for the auto-insurance policy associated with the vehicle associated with vehicle system 102 based on whether the remedial action was performed within the timeframe.

Figure 4:
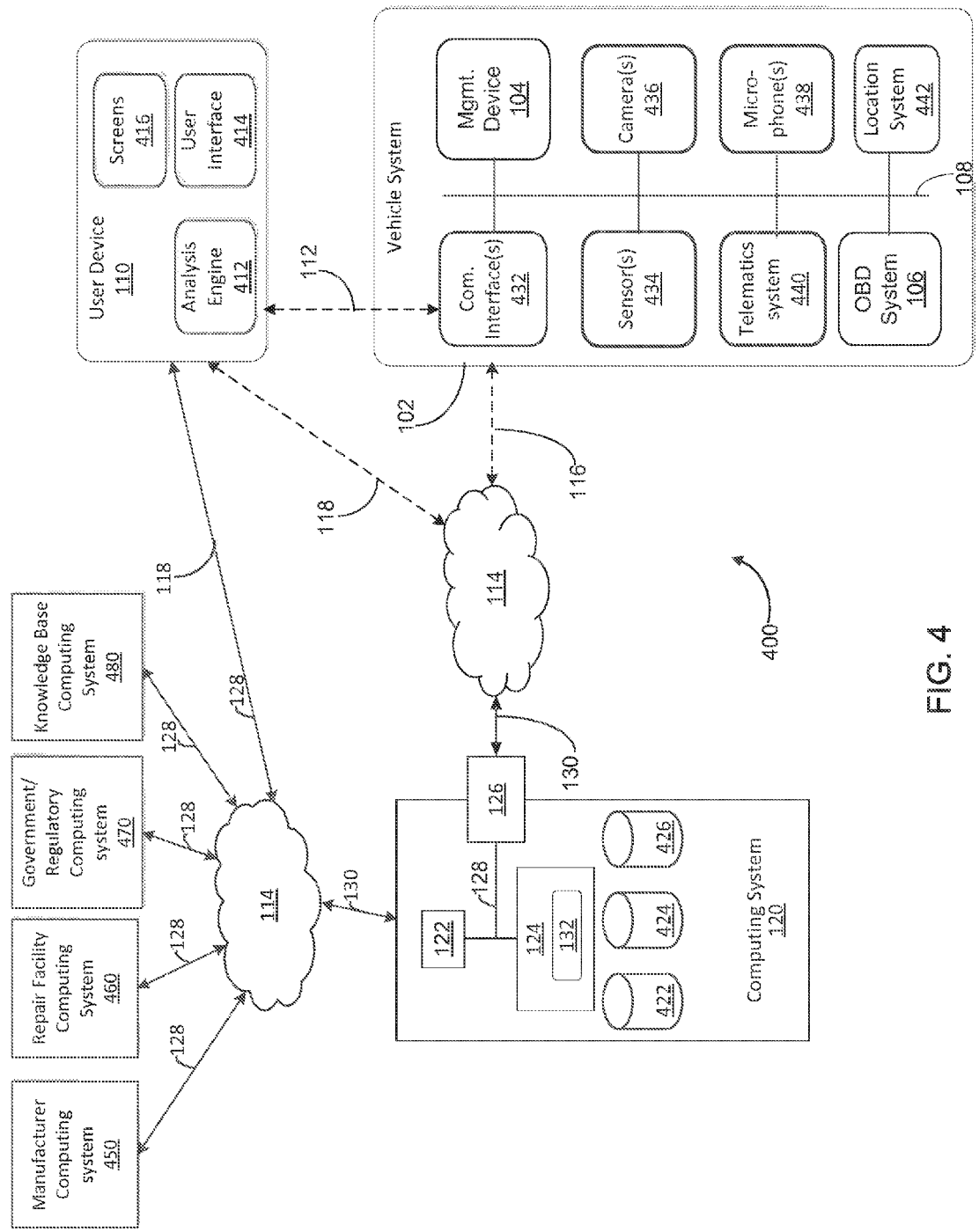
FIG. 4 depicts an illustrative computing environment in accordance with one or more illustrative embodiments.

FIG. 4 depicts an illustrative computing environment 400 in accordance with one or more illustrative embodiments. Here, the illustrative computing environment 400 may include the vehicle system 102 (e.g., the vehicle system 402) that may be communicatively coupled to the user device 110 via the communication link 112. The vehicle system 402 may further include one or more computing devices associated with (e.g., installed at, affixed to, etc.) a vehicle (e.g., an automobile, a car, a truck, a bus, a motorcycle, etc.). For example, the vehicle system 402 may include the management device 104, the OBD system 106, a telematics system 440, and/or a location system 442 (e.g., a global positioning system (GPS), a cellular triangulation system, etc.). In some cases, the vehicle system 402 may further include one or more sensors and/or other devices to monitor the plurality of vehicle systems and/or components. For example, the vehicle system 402 may include one or more sensors 434, one or more cameras 436, one or more microphones and/or one or more other devices to obtain information regarding the operation of the vehicle system 402. The vehicle system may further include one or more communication interfaces 432. The communication interfaces 432 may include at least one transceiver for communicating via a wired or wireless communication link. For example, the communication interfaces 432 may include a communication port for communicating via a wired communication network (e.g., the OBD system), and/or a wireless communication network (e.g., a cellular communication network, a Bluetooth network, etc.).

The OBD system 106 may be configured to receive data from one or more sensors located in various areas of the vehicle and/or to utilize such data to generate one or more diagnostic codes that each may be associated with one or more vehicle conditions. For example, the OBD system 106 may comprise a diagnostic system compliant with one or more vehicle diagnostic standards, such as OBD-II. In such cases, the OBD system 106 may provide a plurality of standardized diagnostic codes. The OBD system 106 may additionally, or alternatively, provide one or more manufacturer specific diagnostic codes. In many cases, the diagnostic codes may include a standardized format, whether or not the vehicle supports one of, or both, the standardized diagnostic codes and the manufacturer-specific diagnostic codes. For example, the diagnostic codes may have a specified format, such as <X><N1><N2><N3><N4>, as defined by OBD II (e.g., P0301—Cylinder 1 Misfire Detected). For example, <X> may correspond to a character describing the system, such as P=Powertrain, B=Body, C=Chassis, and U=Undefined, <N1> may indicate the type of code, such as whether the diagnostic code is a standard code (e.g., 0=Generic (SAE) code) or an enhanced code (e.g., 1=Manufacturer Specific code), <N2> may indicate a vehicle subsystem experiencing an issue or fault (e.g., 1=Emission Management (fuel or air), 2=Injector Circuit (fuel or air), 3=Ignition or Misfire, 4=Emission Control, 5=Vehicle Speed and Idle Control, 6=Computer and Output Circuit, 7=Transmission, 8=Transmission, 9=SAE Reserved, and 0=SAE Reserved, and <N3> and <N4> correspond to a specific fault index (e.g., 00-99).

The interface 108 may communicatively couple one or more vehicle systems and/or sensors, such as the management device 104, the OBD system 106, the sensors 434, the cameras 436, the microphones 438, the telematics system 440, and/or the location system 442. The interface may be used to communicatively couple one or more of the above mentioned systems to the one or more communication interfaces 432. The management device 104 may be any type of computing device configured to receive (e.g., via the interface 108) one or more diagnostic codes generated by OBD system 106, one or more sensor signals from the sensors 434, one or more images or videos from the cameras 436, one or more audio signals from the microphones 438, telematics information from the telematics system 440, and/or a location of the vehicle from the location system 442. In some embodiments, the management device 104 may be configured to process telematics data for the vehicle and/or to generate or communicate telematics data for the vehicle.

The computing environment 400 may also include the user device 110. The user device 110 may be a personal computing device (e.g., desktop computer, laptop computer, tablet computer, smart phone, personal media device, or the like) associated with vehicle system 102 (e.g., a personal computing device associated with an owner and/or operator of the vehicle associated with vehicle system 102). In some embodiments, communication link 112 may support direct, wireless intercommunication between user device 110 and management device 104. For example, communication link 112 may be a BLUETOOTH communication link. The user device 110 may further include an analysis engine 412, such as an analysis application running on the operating system of the user device 110, a user interface 414 (e.g., a touch screen device, a keyboard, a touch pad, a mouse, etc.) that may be configured to present information to the user and/or receive information from the user. In some instances, the user interface 414 may comprise a touchscreen device, or other display device, that may be used to present one or more use interface screens 416 to the user. The one or more user interface screens 416 may be used to present vehicle system information to the user of the user device and/or to receive one or more user inputs that may be used to acknowledge the presentation and/or to provide further information for use in resolving any perceived issue (e.g., a diagnosed fault, a predicted fault, etc.) and/or to identify and/or change a state of a device associated with the vehicle systems, such as a door lock, a window position, and the like.

The computing environment 400 may also include network(s) 114, which may include one or more sub-networks (e.g., local area networks (LANs), wide area networks (WANs), virtual private networks (VPNs), or the like). The communication link 116 may support wireless intercommunication between network(s) 114 and the management device 104 and/or other systems associated with the vehicle (e.g., the sensors 434, the cameras 436, the microphones 438, the telematics system 440, the location system 442, and/or the OBD system). Similarly, the communication link 118 may support wireless intercommunication between the network(s) 114 and the user device 110. For example, the communication link 116 and/or the communication link 118 may include one or more cellular, WIFI, or WIMAX communication links, or the like. In many cases, the communications over the networks 114 and/or sent via the communication links 118, 116, 130 may be encrypted to provide increased data security and limit unwanted access to the vehicle systems from unauthorized parties and/or devices.

The computing environment 100 may also include the computing system 120. The computing system 120 may include one or more of any type of computing device (e.g., desktop computer, laptop computer, tablet computer, smart phone, server, server blade, mainframe, virtual machine, or the like) configured to perform one or more of the functions described herein. In some embodiments, computing system 120 may include one or more of the user device 110, the management device 104, the analysis engine 412, the user interface 414, the user interface screens 416, and/or the OBD system 106. The computing system 120 may be associated with an organization. For example, the computing system 120 may be associated with a business organization that provides auto-insurance coverage for the vehicle associated with vehicle system 102 and/or utilizes telematics data for the vehicle associated with vehicle system 102 such as telematics information received from the telematics system 440, the sensors 434, the cameras 436, the microphones 438, and/or the location system 442. The computing system 120 may include one or more processor(s) 122, memory devices 124, the communication interface 126, and/or the data bus 128. The data bus 128 may interconnect the processor(s) 122, the memory 124, and/or the communication interface 126. The communication interface 126 may be a network interface configured to support communication between the computing system 120 and the network(s) 114 (or one or more sub-networks thereof) via the communication link 130. The memory 124 may include one or more program modules comprising instructions that when executed by the processor(s) 122 may cause the computing system 120 to perform one or more functions described herein. For example, the memory 124 may include the program module(s) 132, which may comprise instructions that when executed by the processor(s) 122 cause the computing system 120 to perform one or more functions described herein.

In some cases, the computing system 120 may further include one or more data repositories storing information associated with one or more vehicles. For example, the computing system 120 may include an insurance information data repository 422, a diagnostic code data repository 424, a discussion board data repository 426, and/or other data repositories. For example, the insurance information data repository 422 may store information corresponding to one or more insurance policies (e.g., vehicle insurance policies, etc.) such as a policy identifier, a name of one or more insured parties associated with a vehicle, an address associated with the one or more insured parties, one or more vehicle identifiers associated with the insured individual(s), preferences information, a policy type (e.g., a personal insurance policy, a commercial insurance policy, etc.), and/or the like.

In some cases, one or more of the computing system 120 and/or the user device 110 may be communicatively coupled to one or more other computing systems associated with a third party. For example, the computing device 120 may be communicatively coupled to the network via the communication link 130 and/or the user device may be communicatively coupled to the network 114 via the communication link 118. In some cases, additional third-party computing system may be accessible over the network 114 via the communication link(s) 119. For example, the one or more third-party computing systems may include a manufacturer computing system 450, a repair facility computing system, 460, a government and/or regulatory agency computing system 470, and/or a knowledge base computing system 480. In some cases, the manufacturer computing system 450 may be associated with a vehicle manufacturer and/or a vehicle parts manufacturer (e.g., an original equipment manufacturer (OEM), a tier 1 parts supplier, a tier 2 parts supplier, etc.). In some cases, the manufacturer computing system 450 may communicate recall information and/or other service related information (e.g., technical service bulletins, advisories, etc.) corresponding to operation, maintenance and/or support of the vehicle system 402. In some cases, the repair facility computing system 460 may be used to schedule a repair or other work to a vehicle, and/or to communicate repair information to the computing system 120 and/or the analysis engine 412 for use in diagnosing and/or predicting a vehicle condition and/or a status of the vehicle system 402. The government and/or regulatory agency computing system 470 may be used to facilitate a vehicle inspection process for one or more vehicles. For example, the government and/or regulatory agency computing system 470 may provide information via the network 114 associated with an emissions testing procedure, a safety inspection procedure, or other vehicle inspection process required by a government agency (e.g., a state regulatory body, a national regulatory body, etc.). In some cases, the government and/or regulatory agency computing system 470 may electronically solicit a vehicle inspection and/or may be configured to electronically receive vehicle status information to determine whether the vehicle passes or fails one or more tests performed during the inspection process. The knowledge base computing system 480 may comprise one or more computing networks (e.g., bulletin boards, discussion boards, social media networks, etc.) allowing a vehicle owner to discuss issues related to the vehicle. For instance, the vehicle owner may discuss a fault or diagnostic code received from the OBD system to determine a possible cause and/or a possible solution. In some cases, the computing system 120 and/or the analysis engine 412 may access the knowledge base computing system 480 to determine whether a particular fault or predicted fault diagnosed for a vehicle system 120 is accurate and/or can be improved. In some cases, the analysis engine 412 and/or the computing system 120 may update one or more rules used in diagnosing and/or predicting vehicle system faults.

In some cases, one or more of the sensors 434, cameras 436, microphones 438 and/or the like included in the telematics system 440 and/or the OBD system 106 may be used to monitor the operation of one or more vehicle systems. For example, the sensors 434 may include one or more of a level sensor, a proximity sensor, a pressure sensor, a wear sensor, an accelerometer with one or more dimensions, a force sensor, a gyroscope, and the like that may be installed during vehicle manufacture or as an after-market addition. These sensors may be used to provide a user with operational and/or status information about the vehicle systems by the management device 104 and/or the analysis engine 412. For example, FIG. 5 comprises an illustrative user interface screen 500 that may be used to display a status of one or more vehicle systems and/or to facilitate user interaction with these one or more vehicle systems. While FIG. 5 shows a visual representation of an illustrative vehicle, other methods of presenting the operational and/or status information of the vehicle systems, such as a table, a tabbed display, a tree structure, and/or the like, may be used in additional or alternate examples.

Figure 5:
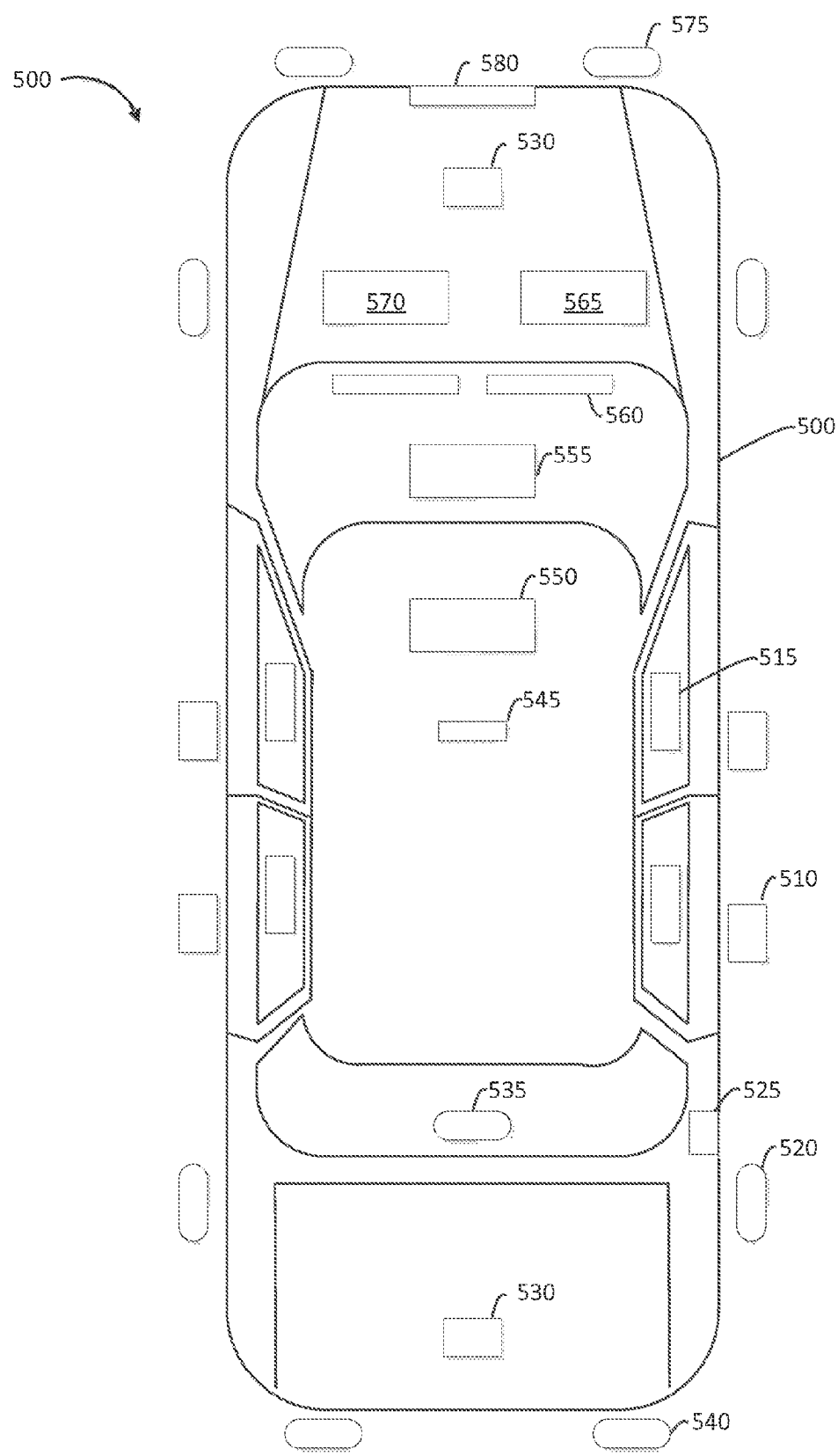
FIG. 5 comprises an illustrative user interface screen for user interaction with one or more vehicle systems in accordance with one or more illustrative embodiments.

FIG. 5 shows an illustrative representation of a vehicle 500 showing one or more status indicators 510-580 for displaying information identified by the analysis engine and/or the management device 104 received from the sensors 434, cameras 436, microphones 438, the telematics system 440 and/or the OBD system 106. For example, the sensors 434 may include a sensor positioned near a vehicle door and/or a vehicle door lock to provide information about whether the door is open, closed, locked or unlocked. The sensors 434 may provide a signal to the analysis engine to be processed and the information may be displayed using the status indicator 510 associated with each door of the vehicle. Similarly, other vehicle openings, such as the truck, hood of the vehicle, tailgate, hatchback, gas tank fill cover, etc., may also be monitored with sensors 434 to provide information status information via the status indicators 530. Similarly, one or more of the vehicle windows may be monitored using the sensors 434 to determine a window position. The window status indicator(s) 515 and/or sun roof status indicator 550 may be updated by the analysis engine 412 showing a current status of the window. For example, the windows may be shown to be open, closed, and/or may indicate to a user an amount (e.g., a percentage) that the window has been opened.

In some cases, not only can a user view status information, the user may also be able to issue commands via the one or more user interface screens 416 in response to the status information provided by the door status indicators 510, the window status indicators 515, and/or other status indicators (e.g., the status indicators 530). For example, a vehicle operator, or owner, may wonder whether a window or sunroof was left open, or a door left unlocked, but may be physically remote from the vehicle and unable to verify in person. In other cases, a parent, guardian, or employer of a driver may want to verify whether the vehicle driver has closed the windows and/or locked the vehicle doors. Here, the user device may process an application that may include the analysis engine 412 and may display one or more user screens, such as the illustrative representation 500 of the vehicle. The user interface may provide a visual, textual, audio, and/or numerical representation of the status of one or more vehicle systems. For example, the door status may be shown by the door status indicators 510 as locked or unlocked using text (e.g., "locked", "unlocked", etc.) and/or a color (e.g., red, green, etc.). The status may be shown directly on the representation 500 of the vehicle, or by using other user interface tools (e.g., a tool tip, hover display, etc.). Similarly, a window status may be shown via the window status indicators 515 showing the window as open (e.g., "open", green color, etc.), closed (e.g. "closed", red color, etc.) or partially open (e.g., "x % open", etc.). Based on the information provided by the status indicators 510, 515, 530, the user may enter a command via the user interface device 414 to cause a door to lock or unlock, cause the window to open or close, cause the sunroof to open or close, cause a tailgate or hatchback to open or close, and the like.

In some cases, the user may configure preferences via a user interface screen to modify a state of a door lock and/or adjust a window position based on sensor readings and other information. For example, the user may desire to automatically close any open windows when inclement weather (e.g., rain, snow, etc.) is present and/or predicted. The analysis engine may receive sensor data from the sensors 434, cameras 436, and/or microphones to determine weather conditions near the vehicle. In some cases, the analysis engine may request, or otherwise receive, weather information from a weather forecasting computer system via the network 114. The sensor information may include signals from a moisture sensor indicating a presence of moisture (e.g., rain, snow, sleet, etc.) at the vehicle, a barometer may provide a signal indicative of a change in atmospheric pressure near the vehicle, a camera may show building clouds and/or precipitation, etc. The analysis engine 412 may process the received sensor information to determine whether inclement weather conditions are present, or may soon be present, near the vehicle. For instance, a sensor signal, or combination of signals (e.g., a weighted combination) may be processed (e.g., compared to one or more thresholds) to determine a likelihood that an inclement weather condition is present, or soon may be present. The analysis engine 412 may then notify the user of the identified weather condition via the user interface screens 416, a text message, an email, etc.

The user may then issue a command via the user interface screens 416 to the vehicle system 102 to change the present status of the door lock, the window position, etc. For example, the user may issue a command to lock, or unlock, a door and/or a command to open, or close a window, either partially or completely. In some cases, the user may desire to configure preferences to allow the analysis engine to automatically issue a command to the vehicle system 102 based on the analysis of the sensor information, camera information, microphone information, telematics information, OBD system information, location information and/or the like. For example, the user may desire the analysis engine 412 to close a window or sunroof when inclement weather is present. In other cases, the user may desire the analysis engine 412 to close a window when inclement weather is predicted, such as within a specified timeframe (e.g., 30 minutes, 1 hour, etc.). In some cases, the user may set a preference to open a window or sunroof, at least partially, when a specified temperature threshold inside the vehicle has been reached. For example, the analysis engine may automatically open a window (e.g., to a specified opening size such as about 5%, about 10%, etc.) when an internal temperature of the vehicle has reached a threshold temperature (e.g., about 90° F., etc.). In some cases, the user may specify a rule to automatically open windows when movement has been detected within the interior of the vehicle, such as from movement of a person or animal. In such cases, the windows may be automatically opened when the temperature has reached a lower threshold (e.g., about 70° F.), and/or if movement has been detected. Also, in such cases, the user may configure the analysis engine to generate one or more messages to individuals to notify (or remind) them that an individual is present in the vehicle and/or that a pet has been left within the vehicle for a duration of time.

Similarly, the sensors 434, the cameras 436, and/or the microphones 438 may be used to monitor a status of the wheels and/or tires, where the analysis engine and/or management device 104 may update a tire status indicator 520 for each wheel of the vehicle. For example, a pressure sensor may be used to monitor a tire pressure for each wheel. The analysis engine 412 may compare the pressure reading to a threshold associated with a desired tire pressure as specified by the tire manufacturer based on the tire model, a pressure specified in an insurance policy, etc. Additionally, a camera, or other optical sensor, may be used to monitor tread wear of the tire. For example, the camera 436 or optical sensor may be positioned to include at least a portion of the tread within a viewing angle of the camera 436 and/or optical sensor. The analysis engine 412 may receive the information via the network 114 and analyze the received sensor data (e.g., an image) to determine an extent of wear experienced by the tire. For example, the analysis engine may compare current image to a previously saved image having a known wear life, to determine an amount of wear experienced by the tire. For example, the analysis engine may be configured to identify a wear indicator on a tire and to compare a sensed tread depth to a previously known tread depth to determine an amount of wear experienced at the tire. In some cases, a rate of wear may be identified by comparing successive tread wear indications as stored by the analysis engine 412. In some cases, a wear sensor may be installed in association with a break pad at the wheel, and the analysis engine 412 may analyze a signal provided by the wear signal to determine a break pad status, which in turn may be indicated to the user via the user interfaces 416. In some cases, a microphone 438 near the vehicle may be located to provide a "road noise" signal that may be analyzed to determine a status of a wheel or tire. For example, an periodic noise produced near a tire may be indicative of a nail, or other foreign object, being lodged in the tire or tire tread. Further, the audio signals provided by the microphones 438 may also provide information corresponding to wear near the wheels, such as in a bushing or linkage, which then may be identified using one or more audio analysis techniques by the analysis engine 412 to determine whether an issue with the wheel systems of the vehicle may be present.

Based on the analysis by the analysis engine 412 and the status information provided via the user interface, an action may be initiated either automatically by the analysis engine or in response to a command received by the user. For example, the analysis engine 412 may identify one or more tires having a tire pressure outside of an allowable range (e.g., about ±1 psi, about 2 psi, etc.) and display the resulting tire status on the user interface, such as at the wheel status indicator 520 using a color (e.g., red, etc.), a numerical value (e.g., "29", "33", ">±1", etc.), a textual message (e.g., "low", "high", "falling", etc.). In some cases, the analysis engine 412 may process sensor information at successive time intervals to determine whether a tire pressure may be changing (e.g., falling, etc.) over time. This changing status may also be communicated by the analysis engine 412 to the user via the one or more user interface screens 416. In some cases, the analysis engine may use the status information (e.g., a tire deflation rate) to predict when a tire may become flat and/or otherwise become too underinflated for safe driving. In some cases, the user interface screen 416 may indicate whether the tires include so-called "run flat" technology, which may also be included into the analysis performed by the analysis engine.

In response to an identified, or predicted, tire status, the user may manually request a remedial action to be scheduled, and/or the analysis engine 412 may automatically schedule a remedial action to take place. For example, the user may enter a command via the user interface 414 to request a tire inflation service to be performed on the one or more tires of the vehicle. The tire inflation service may be included as part of an insurance policy, roadside service plan, and/or the like. In some cases, in response to the identified, or predicted, tire inflation issue, the analysis engine may request policy information from the insurance information data repository 422 via the network based on user and/or vehicle identification information. The insurance information may include policy information associated with the vehicle including an indication whether a roadside service plan is indicated, whether a tire inflation service has been included with any roadside service plan, and/or one or more user preferences as to whether a notification is to be sent before requesting a tire inflation service call. If the analysis engine 412 determines whether the user has not subscribed to a roadside service plan and/or a tire inflation service, the analysis engine may generate a message via the user device 110 and/or one or more other mechanisms (e.g., a text message, an email, a letter, a voice message, etc.) providing information about the tire status and/or an offer to enroll the user in at least one of the roadside service plan and a tire inflation service plan. If enrolled, the analysis engine may further analyze preset preferences, either default or specified by the vehicle owner, to determine an action to be taken in response to an identified tire inflation issue. For example, the vehicle owner may specify that a tire inflation service call to a present location of the vehicle, or a predetermined location of the vehicle (e.g., a home address) may be automatically scheduled by the analysis engine 412. The analysis engine 412 may, via the network 114, access one or more repair facility computing systems 460 to determine a repair facility having a location near to an address associated with the vehicle policy and/or near to the geographical location of the vehicle based on location information provided by the location system 442. If found, the analysis engine 412 may notify the user that an appointment has been scheduled and/or that the user may schedule an appointment with the repair facility to provide the inflation service for the tires of the vehicle. In some cases, the inflation service may be provided as a no-fee service, as a pre-paid service, or may be a reimbursable service where a receipt may be imaged by the user device 110 for submission to the insurance provider computing system by the analysis engine 412.

Similarly, for an identified tread wear issue with one or more tires of the vehicle, the analysis engine 412 may predict, based on a tread wear pattern and/or historical driving information (e.g., miles per week, aggressive driving information, etc.), an expected tread life for the model of tire, weather information, etc., an expected remaining tread life for the tire. In some cases the analysis engine 412 may further analyze images and/or audio signals in predicting the remaining tread life. In some cases, the analysis engine 412 may further identify one or more replacement tire models based on a make and model of the vehicle (e.g., obtained from the insurance information data repository 422, etc.), on a tire model suggested as part of an insurance policy or an insurance policy incentive program (e.g., a discount may be provided based on an age of a tire, a remaining tread life of the tire, and whether, a tire style such as a performance tire, an all-weather tire, etc.), and/or based on a user preference. After determining a suggested tire model, location information of the vehicle may be obtained from the location system 442 and/or a registered vehicle address may be obtained via the network 114 from the insurance information data repository 422. The analysis engine 412 may then analyze the location information, tire selection information, hours of operation, user preference information, pricing information, discount information, and the like to determine one or more repair facilities that may provide a tire service to the vehicle. In some cases, the analysis engine may notify the user or vehicle owner of the determined repair facilities via the user interface screens 416, an email, a text message, a voice message, a letter, and the like. In other cases, when specified by the user or within the vehicle insurance information obtained from the insurance information data repository 422, the analysis engine may automatically schedule an appointment at a repair facility near to the current location of the vehicle and/or near to an address registered to the vehicle.

Returning to FIG. 5, one or more sensors 434 may be used to determine a fluid level status associated with one or more vehicle systems, such as a fuel level status, an oil level status, a washer fluid level status, a transmission fluid status, a brake fluid status, a clutch fluid status, etc. In doing so one or more level sensors may be disposed near a fluid reservoir to provide a signal to the analysis engine and/or the management device 104 corresponding to a current fluid level within the associated fluid reservoir. For example, a fuel level may be monitored within the fuel tank with an installed level sensor with greater, or at least near the same, accuracy of the installed fuel gauge of the vehicle. Additional sensors may be installed to provide further information about the fluid status including a pressure sensor for providing fluid pressure information, a turbidity sensor for providing turbidity information about the fluid, etc. In some cases, a pressure sensor may provide additional information for the analysis engine 412 to determine a status of a system component. For example, a signal received from a pressure sensor installed in a fuel line may be used to in determining whether a fuel filter is nearing replacement, based on an increasing pressure reading. A turbidity sensor may provide a signal that may be analyzed by the analysis engine to determine whether impurities may be present within the fluid reservoir. For example, the analysis engine 412 may analyze a signal received from a turbidity sensor to determine whether an impurity (e.g., water, sediment, etc.) is present within the fuel tank or other fluid reservoir.

In some cases, the analysis engine 412 may analyze a signal received from a fuel level sensor disposed near the fuel tank of a vehicle. The fuel level sensor may be provided additional to a fuel level sensor provided when the vehicle was manufactured, or may be the same fuel level sensor. In some cases, the analysis engine 412 may access historical fuel efficiency information and historical driving performance data (e.g., one or more common routes, historical traffic patterns, length of time spent idling, historical velocity and acceleration information, etc.), along with the current driving performance information obtained from the OBD system, the telematics system, and/or sensors 434 to predict a duration of time during which the vehicle may burn the remaining fuel in the fuel tank. This time duration may be adjusted in near real-time based on current telematics information, driving performance information, traffic information, and/or weather information. In some cases, the analysis engine 412 may further predict a distance that may be traveled before the fuel tank is empty. The analysis engine 412 may then display the predicted time duration and/or the remaining distance that may be traveled, in some cases updated in near real time, on a user interface screen 416. In addition, the analysis engine 412 may present to a user, based on the prediction and current vehicle operation information, an indication that the fuel level has decreased below a predetermined level and/or that a remaining time or distance has fallen before a predetermined threshold. For example, a status indicator 525 may be associated with a fuel level indicator. In some cases, the analysis engine 412 may display a fuel level status as a visual indicator, an audio indicator and/or a textural indicator using the status indicator 525. For example, when a fuel level is above a specified threshold (e.g., about ⅛ of a tank), above a specified operation time before the fuel tank is predicted to empty (e.g., about 30 minutes, about 15 minutes, etc.), and/or a predicted range (e.g., about 15 miles, about 20 miles, etc.) is above a specified distance before the fuel tank is predicted to empty, the fuel level indicator 525 may display an indication that the fuel level is not near empty. For example, in such cases, the fuel level indicator may be displayed as a specified color (e.g., green), may provide textual representation that the fuel level is "good", or may provide a quantitative value corresponding to the fuel level (e.g., a value near the actual fuel volume), a distance that may be traveled before the fuel tank is empty, and/or a time before the fuel tank is predicted to be empty.

In some cases, the analysis engine 412 may be configured to retrieve information corresponding to a fuel service program that may be offered to a vehicle owner as a portion of an insurance policy and/or as a program additional to an insurance policy (e.g., a roadside assistance program, etc.). As such, the analysis engine 412 may access the insurance information data repository 422 via the network 114 to retrieve information about whether the vehicle owner or operator is participating in a fuel service program. If not, the analysis engine may be configured to provide an offer to enroll in the program to the owner or operator via a user interface screen 416 on the user device, a text message, an email, a letter, a voice message, and/or a prompt to an insurance agent or call center to call the vehicle owner or operator. If the vehicle owner or operator has enrolled, or accepted an enrollment offer, the analysis engine may access one or more preferences associated with the fuel service program corresponding the vehicle based on information stored in the insurance information data repository 422. For example, a user may prefer to merely be notified, such as by using the fuel level indicator 525, that a low fuel level situation is occurring. As discussed above, the analysis engine 412 may notify the user via a visual indicator (e.g., a red fuel level indicator 525), textual information (e.g., the fuel level indicator 525 displaying a time or distance remaining to be traveled, a current remaining fuel level, etc.), and or issue an audio indication (e.g., a buzzer, a beep, a chime, a ringtone, etc.) specified to indicate that a low fuel level has occurred. Alternatively, or in addition to, the analysis engine 412 may determine that a user has requested to be contacted (e.g., via a text message, via a phone message, via a user interface screen 416, etc.) and asked whether to accept or decline a fuel delivery (e.g., about 1 gallon, about 2 gallons, an estimated amount of fuel to reach a preferred refueling station, enough fuel to fill the fuel tank, etc.). If a fuel service delivery is declined, the analysis engine 412 may continue to monitor the fuel level and may be configured to re-contact the vehicle owner or operator when a second lower threshold has been met. In some cases, the vehicle owner or operator may "opt in" to accept a fuel delivery service automatically and/or if the cost of the service is below a predefined threshold (e.g., less than about $30, less than about $20, free, etc.). When a fuel delivery service offer is accepted, either automatically by the analysis engine or in response to a received user input, the analysis engine 412 may request, via the network, a fuel service delivery from a repair or refueling facility near the current location of the vehicle. In some cases, the analysis engine may identify a route upon which the vehicle is travelling and predict a location along the route near which a fuel delivery can be made. In doing so, the analysis engine may receive location and/or routing information from the location system 442, receive fuel level information from the fuel level sensor, velocity information from the OBD system 106, traffic information from an external traffic information computing system, and/or weather information from a weather information computing system, and analyze the received information to determine a time at which a fuel deliver may be scheduled and/or a location at which a fuel delivery can occur. Once the analysis engine identifies the time and/or location at which a fuel delivery can occur, the determined refueling service provider and the vehicle driver are messaged (e.g., a text message, a phone message, an email, a user interface screen, etc.) with the time and location where the fuel deliver is to be made.

In some cases, one or more other sensors 434 may be provided to monitor one or more other systems of the vehicle, including a cabin temperature sensor, a brake pad wear sensor, an optical sensor for determining an operation status of a lamp (e.g., a headlight, turn signal, a taillight, a dome light, a dashboard light, a truck light, etc.), a wear sensor for sensing wear of a wiper blade, a sensor configured to determine a condition of a windshield, a cooling system temperature sensor and the like. In some cases, the analysis engine 412 may be configured to analyze signals received from the above sensors to determine a status of one or more components of the associated vehicle system.

In an example, the analysis engine 412 may be configured to monitor a temperature of an interior space (e.g., the cabin) of the vehicle and/or predict a time at which the temperature of the interior space of the vehicle will meet or exceed a predefined threshold. In some cases, the threshold may be dynamically adjusted based on another sensor reading, such as a signal received from a motion sensor (and/or occupancy sensor) that senses whether the interior space is occupied by a person and/or an animal. When the analysis engine 412 senses that the interior space is occupied, a temperature threshold may be reduced from an unoccupied vehicle temperature threshold (e.g., about 90° F., etc.) to an occupied temperature threshold (e.g., about 80° F., etc.). For example, the analysis engine 412 may analyze the temperature signal from a cabin temperature sensor, an occupancy signal from a motion sensor (or similar occupancy sensor), an outside temperature reading, weather forecasting information obtained from a weather prediction computing system, a window level sensor reading, and/or similar sensor readings. In some cases, the analysis engine 412 may, based on the analysis of the sensor signals and/or the weather forecasting information, determine that the interior temperature of the vehicle meets or exceeds the predetermined threshold. The analysis engine 412 may initiate an action to reduce the temperature and/or mitigate further temperature increases. For example, the analysis engine 412 may initiate a window position adjustment command to one or more windows of the vehicle and/or a sunroof, where the position adjustment command may adjust a window position to increase the window opening size to a predetermined size (e.g., about 1 inch, about 2 inches, etc.). Conversely, if a cabin temperature is below a second minimum temperature threshold, the analysis engine 412 may initiate a position command to close, or otherwise decrease an opening size of one or more of the windows and/or the sunroof. In some cases, the analysis engine may predict when temperature will meet or exceed the threshold and initiate a window position adjustment to slow a temperature increase within the interior space of the vehicle before the threshold temperature has been reached. In some cases, such as when the interior space is determined to be occupied based on the occupancy sensor information, the analysis engine 414 may be configured to activate a vehicle cooling system (e.g., an air conditioning system of the vehicle) to cool the interior space of the vehicle so that the temperature within the interior space of the vehicle is maintained at least near a temperature range safe for humans and/or animals. In such cases, the analysis engine 412, upon identifying that the vehicle is occupied and the temperature is predicted to at least meet a specified temperature threshold, the analysis engine 412 may provide an indication to the owner or driver of the vehicle via the user interface 416 (e.g., a cabin temperature indicator 545, etc.), a text message, a phone call, an email and/or the like. The indication may include a temperature reading and information regarding whether a temperature threshold has been met, an occupancy status of the vehicle (e.g., an alarm indicator), a time until the temperature threshold may be met or exceeded, and/or the like.

In some cases, the sensors 434 may further include an optical sensor for sensing a status of a an optical sensor for determining an operation status of a lamp (e.g., a headlight, turn signal, a taillight, a dome light, a dashboard light, a truck light, etc.). For example, the analysis engine may provide an indicator for one or more of the exterior and interior vehicle lamps, such as a brake light indicator 535, 540, a turn signal indicator (not shown) a headlight indicator 575, a cabin light indicator (not shown), and the like. The analysis engine 412 may receive a signal from one or more optical sensors located near a vehicle light source and analyze the signal to determine whether or not the light is illuminated when expected to be illuminated, such as when the headlamps or turn signals are activated, the vehicle is actively braking, and the like. In some cases, the analysis engine 412 may access archived diagnostic information to determine an operating life estimate for each light being monitored and base on that information, predict a remaining lifetime until failure for each of the different monitored lamps. In such cases, the analysis engine 412 may update the status of each lamp on the associated indicators 535, 540, and 575. Additionally, the indicator may display the predicted remaining lifetime for each of the monitored lamps. In such cases, when covered by a roadside assistance plan or insurance policy, a lamp replacement service may be initiated by the analysis engine 412 to schedule a replacement (or order a replacement lamp) when a lamp has been determined to have failed or near a time the lamp has been predicted to fail.

In some cases, the vehicle may include an optical sensor, or imaging device, configured to monitor a status of a windshield of the vehicle. In such cases, the imaging device or optical sensor may provide information corresponding to obstructed visibility through the windscreen. For example, the optical sensor may be configured to sense variations in the glass corresponding to cracks, pitting, breakage, or other physical impairments to the windscreen integrity. Additionally, during wet conditions a poorly cleared or otherwise obstructed windscreen may correspond to a condition of one or more windshield wiper blade condition. A wiper status indicator 560 may be provided for each wiper blade installed on the vehicle. The analysis engine may predict, based on input received from the optical sensors and/or imaging device a duration of remaining life for each wiper blade, an indication of which may be provided to a user via the wiper status indicator 560. In such cases, when covered by a roadside assistance plan or insurance policy, a wiper blade replacement service may be initiated by the analysis engine 412 to schedule a replacement (or order a replacement wiper blade or wiper blade assembly) when a wiper blade has been determined to have failed or near a time the wiper blade has been predicted to fail. The analysis engine 412 may further determine a wiper blade model for each wiper blade based on vehicle make and/or model information retrieved from the insurance information data repository 422.

In some cases, two or more status indicators may be included in a status indicator, such as the status indicator 565. In an illustrative example, the status indicator 565 may comprises two or more fluid level indicators, such as a fluid level indicator for engine oil, clutch fluid, automatic transmission fluid, brake fluid, window washer fluid, and/or the like. In some cases, the analysis engine 412 may analyze a signal received from a fuel level sensor disposed near a reservoir of each of the plurality of fluids to provide a signal representative of an amount of fluid (e.g., engine oil, transmission fluid, clutch fluid, brake fluid, window washer fluid, etc.) of a vehicle. In some cases, the analysis engine 412 may access historical fluid level information and/or historical driving performance data (e.g., one or more common routes, historical traffic patterns, length of time spent idling, weather information, historical velocity and acceleration information, etc.), along with the current driving performance information obtained from the OBD system, the telematics system, and/or sensors 434 to predict a duration of time during which the fluid level may drop below a specified threshold. This time duration may be adjusted in near real-time based on current telematics information, driving performance information, traffic information, and/or weather information. The analysis engine 412 may then display the fluid level and/or predicted time duration which may be, in some cases, updated in near real time on a user interface screen 416 within the status indicator 565. In addition, the analysis engine 412 may present to a user, based on the prediction and current vehicle operation information, an indication that the fluid level has decreased below a predetermined level and/or that a remaining time has fallen before a predetermined threshold. In some cases, the analysis engine 412 may display a level status as a visual indicator, an audio indicator, and/or a textural indicator using the status indicator 565. For example, when a fuel level is above a specified threshold (e.g., near full, above ¾ full, etc.), above a specified operation time before the reservoir is predicted to fall below a second predetermined threshold (e.g., about 30 minutes, about 15 minutes, etc.) the fluid indicator associated with a particular fluid indicator may display an indication that the fluid level is within a desired specification. For example, the each fluid level indicator may be displayed as a specified color (e.g., green, red, etc.), may provide textual representation that the fuel level is "good", "low", etc., and/or may provide a quantitative value corresponding to the fluid level (e.g., a value near the actual fuel volume and/or a time before the fluid level in an associated reservoir is predicted to fall below a specified minimum level. In some cases, when covered by a roadside assistance plan or insurance policy, a fluid level refill service may be initiated by the analysis engine 412 to schedule a refill of one or more of the fluid reservoirs (or schedule a service appointment) when the fluid level has been determined to have fallen below a specified value and/or near a time the fluid level has been predicted to fall below the specified level. In some cases, the user interface screen 500 may include a status indicator 570 to display information associated with the status of one or more systems monitored by the telematics system 440 and/or the OBD system 106. This information may be displayed as individual indicators, tables, a tree structure, and/or the like on the user interface screen 500 or may be displayed on one or more different user interface screen Vehicles may be registered with a governmental body as a personal vehicle, a commercial vehicle or a vehicle used for both commercial and personal uses. Each state, or country, may have a different emissions testing policy and/or vehicle safety inspection policy. In some cases, the emissions testing policies and/or vehicle safety inspection policies may be different based on a use (e.g., personal use, commercial use, etc.) for the vehicle. In many cases, the vehicle inspection process may be performed at a designated facility, however in some cases, the vehicle inspection process may be performed remotely, and the results of the inspection process may be submitted to the government agency for certification. In an illustrative example, the analysis engine may identify whether a vehicle is registered as a personal vehicle, a commercial vehicle or both based on insurance information retrieved from the insurance information data repository 422. Based on the identified vehicle registration information, the analysis engine may retrieve one or more inspection requirements from a data repository of the governmental/regulatory agency computing system 470. This information may be used by the analysis engine as rules for examining the data received from the sensors 434, the telematics system 440, the OBD system 106, the camera(s) 436, and/or the microphone(s) 438 corresponding to one or more vehicle systems. For example, the analysis engine 412 may retrieve emissions information from the OBD system 106 in response to one or more rules based on emission testing information retrieved from the government/regulatory agency computing system 470. Further, the analysis engine 412 may retrieve vehicle safety information from the vehicle system 104 in response to one or more rules based on vehicle safety testing information retrieved from the government/regulatory agency computing system 470. In an illustrative example, the vehicle safety inspection may be performed on one or more vehicle systems as specified in the testing protocols provided via the governmental/regulatory agency computing system 470, such as the braking system, the wheels, the vehicle glass, the lighting system, the wiper blades, the vehicle horn, etc.

In some cases, the inspected vehicle systems and/or the standards to which the vehicles systems are tested may vary based on a vehicle type classification, such as a passenger cars and light duty truck category, a medium truck and heavy truck and bus category, a recreational truck, semi-truck and recreational vehicle category, a motor cycle category, a motor driven cycle and motorized pedalcycle category, and the like.

In an illustrative example, a safety inspection of vehicles classified in a passenger car and light truck category may be performed by the analysis engine by analyzing information associated with the operation of one or more vehicle components. The analyzed information may include one or more components of a suspension system, a steering system, a braking system, a tire and wheel system, a lighting and electrical system (e.g., a battery status, a bulb status, etc.), glazing (e.g., glass, windows, etc.), mirrors, a windshield washer system, a heating and cooling system (e.g., a defroster), a wiper system, a fuel system, the speedometer, the odometer, an exhaust system, a horn and a warning system, the body and chassis, and the like. In some cases addition information to be monitored may be based on further safety and/or business rules associated with an insurance policy offered to or provided to a vehicle owner.

After retrieving the insurance information and the regulatory requirements associated with the vehicle, as determined by an analysis of the insurance information, the analysis engine 412 may receive information from one or more of the management device 104, the OBD system 106, the telematics system 440 and/or signals received from the sensors 434. Additionally, the analysis engine may further receive image information from the one or more cameras 436 and/or audio information from the one or more microphone(s) 438 based on which vehicle system is being inspected and/or an identified issue (e.g., a fault code, an out of specification sensor reading, etc.) with one or more components of the vehicle. For example, when testing a braking system, a signal from a force sensor installed and associated with a brake pedal may provide information corresponding to an amount of force applied to the brake pedal by a driver. This information may be received and/or archived in a memory during normal operation, or a designated testing period, for analysis by the analysis engine to measure ensure that an amount of force applied to the pedal is within an allowable range (e.g., a "moderate force range" comprising from about 35 pounds to about 65 pounds in a non-assist system, from about 12 pounds to about 22 pounds in a power-assist system, etc.). In some cases, an additional sensor may be used to provide a signal corresponding to an amount of distance traveled by the brake pedal when a moderate braking force has been applied, where this signal may be compared to a specified threshold or specified range of travel. In some cases, required vehicle testing (e.g., emissions testing, safety testing, etc.) may be performed during normal driving. In some cases, emissions testing and/or safety testing may be performed during times designated for performing the required vehicle testing. Further, in some cases, the vehicle driver may receive instructions such as via one or more user interface screens 416 presented to the user on the user interface device 414, to schedule a time designated to perform the required vehicle testing. The user interface screens 416 may further facilitate input from the user in response to questions presented by the analysis engine 412 during the testing process. For example, the analysis engine 412 may request that a user record audio and/or obtain images of system components during at least a portion of the test, such as by using the one or more cameras 436 and/or the one or more microphones 438. For example, the vehicle owner or driver may be prompted for an image of an exterior surface of the vehicle for analysis using a video analysis algorithm by the analysis engine 412 to determine whether the exterior surface or vehicle components are damaged (e.g., rusted, torn, bent, etc.) in such a way that may present a hazard to an occupant, a pedestrian, a cyclist, or other vehicles.

The analysis engine 414 may tabulate and/or analyze results from a plurality of tests associated with the regulatory inspection process (e.g., the safety inspection, the emissions inspection, etc.). In some cases, the analysis engine 412 may be configured to communicate, via the network 414 to the governmental and/or regulatory agency computing system 470 and/or the business organization computing system 120, an indication that the vehicle passed or failed, or is predicted to pass or fail, one or more tests during the regulatory inspection process. In some cases, the analysis engine 412 may be configured to provide (e.g., communicate via a network) a passing or failing result and/or testing data for the test, or a portion of the test, directly to the appropriate governmental or regulatory body (e.g., the governmental/regulatory agency computing system 470 via the network 414. In other cases, the analysis engine 412 may provide results and/or testing data to the computing system 120 for use in determining a coverage amount for an insurance policy, an incentive for an insurance policy, a discount for an insurance policy, a rate for the insurance policy and/or the like. In some cases, the computing system may further process the testing information for communication to the vehicle owner, a driver of the vehicle that may be different than the vehicle owner, the governmental or regulatory agency, and/or the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising: a communication interface; at least one processor; and a memory storing computer-executable instructions that, when executed by the at least one processor, cause the system to: receive, via the communication interface and from a computing device installed in or at a vehicle, a first diagnostic code generated by an on-board diagnostic system of the vehicle; determine, based on the first diagnostic code, an issue with the vehicle; determine, based on the issue, a remedial action for addressing the issue and a recommended timeframe for performing the remedial action to address the issue, wherein the timeframe is determined based at least in part on insurance policy information and a number of incentives associated with the insurance policy information; store, in a record associated with the vehicle, data identifying the issue, the remedial action, and the timeframe; receive, via the communication interface and from the computing device installed in or at the vehicle, a second diagnostic code generated by the on-board diagnostic system of the vehicle: and determine, based on the second diagnostic code, whether the remedial action was performed within the timeframe.

2. The system of claim 1, wherein the memory stores further computer-executable instructions that, when executed by the at least one processor, cause the system to: receive, via the communication interface and from the computing device, an identifier associated with the vehicle; and identify, based on the identifier, an auto-insurance policy associated with the vehicle.

3. The system of claim 2, wherein the memory stores further computer-executable instructions that, when executed by the at least one processor, cause the system to: generate a notification identifying the issue, the remedial action, and the timeframe; identify, based on the auto-insurance policy, a recipient associated with the vehicle; and communicate, to the recipient, the notification.

4. The system of claim 3, wherein the memory stores further computer-executable instructions that, when executed by the at least one processor, cause the system to: identify, based on a storage address of the vehicle indicated by the auto-insurance policy, one or more service locations equipped to perform the remedial action, and wherein the notification identifies the one or more service locations.

5. The system of claim 4, wherein the memory stores further computer-executable instructions that, when executed by the at least one processor, cause the system to: identify, based on the auto-insurance policy, one or more discounts available to holders of the auto-insurance policy at the one or more service locations, and wherein the notification identifies the one or more discounts.

6. The system of claim 3, wherein the memory stores further computer-executable instructions that, when executed by the at least one processor, cause the system to: identify, based on a storage address of the vehicle indicated by the auto-insurance policy, a cost estimate for the remedial action, and wherein the notification comprises the cost estimate.

7. The system of claim 3, wherein the memory stores further computer-executable instructions that, when executed by the at least one processor, cause the system to: determine, based on information indicated by the auto-insurance policy, at least one of the issue, the remedial action, or the timeframe.

8. The system of claim 7, wherein the diagnostic code is specific to a make and model of the vehicle, and wherein the memory stores further computer-executable instructions that, when executed by the at least one processor, cause the system to: determine, based on a make and model of the vehicle indicated by the auto-insurance policy, the at least one of the issue, the remedial action, or the timeframe.

9. The system of claim 3, wherein the memory stores further computer-executable instructions that, when executed by the at least one processor, cause the system to: determine, based on information from one or more claims previously filed under the auto-insurance policy, at least one of the issue, the remedial action, or the timeframe.

10. The system of claim 3, wherein the memory stores further computer-executable instructions that, when executed by the at least one processor, cause the system to: determine, based on a make and model of the vehicle indicated by the auto-insurance policy, that the issue is associated with a recall issued by a manufacturer of the vehicle, and wherein the notification indicates that the issue is associated with the recall.

11. The system of claim 3, wherein the memory stores further computer-executable instructions that, when executed by the at least one processor, cause the system to: determine, based on a make and model of the vehicle indicated by the auto-insurance policy, that the issue is covered by a warranty on the vehicle, and wherein the notification indicates that the issue is covered by the warranty.

12. The system of claim 3, wherein the memory stores further computer-executable instructions that, when executed by the at least one processor, cause the system to: determine, based on a make and model of the vehicle indicated by the auto-insurance policy, that the issue is not covered by a warranty on the vehicle, and identify, based on the make and model, an extended-coverage warranty that would have covered the issue, and wherein the notification identifies the extended-coverage warranty.

13. The system of claim 3, wherein the timeframe indicates that the remedial action should be performed immediately, wherein the memory stores further computer-executable instructions that, when executed by the at least one processor, cause the system to: determine that the auto-insurance policy covers roadside assistance, and wherein the notification indicates that the remedial action should be performed immediately and that the auto-insurance policy covers roadside assistance.

14. The system of claim 3, wherein the memory stores further computer-executable instructions that, when executed by the at least one processor, cause the system to: receive, via the communication interface and from the computing device, an odometer reading for the vehicle; determine, based on the odometer reading and a make and model of the vehicle indicated by the auto-insurance policy, that the vehicle is due for scheduled maintenance; generate a reminder regarding the scheduled maintenance; and communicate, to the recipient, the reminder.

15. The system of claim 3, wherein the memory stores further computer-executable instructions that, when executed by the at least one processor, cause the system to: identify, based on the identifier, a maintenance history for the vehicle; and communicate, to the recipient, at least a portion of the maintenance history.

16. The system of claim 3, wherein the memory stores further computer-executable instructions that, when executed by the at least one processor, cause the system to: alter the auto-insurance policy based on whether the remedial action was performed within the timeframe.

17. The system of claim 3, wherein the memory stores further computer-executable instructions that, when executed by the at least one processor, cause the system to: determine, based on whether the remedial action was performed within the timeframe, a renewal premium for the auto-insurance policy.

18. A method, comprising: receiving, by one or more computers, data comprising: an identifier associated with a vehicle, and a first diagnostic code generated by an on-board diagnostic system of the vehicle; identifying, by the one or more computers and based on the identifier, an auto-insurance policy associated with the vehicle; and determining, by the one or more computers and based on the first diagnostic code and information indicated by the auto-insurance policy, at least one of an issue with the vehicle, a remedial action for addressing an issue with the vehicle, or a timeframe for addressing an issue with the vehicle; receiving, by the one or more computers, a second diagnostic code generated by the on-board diagnostic system of the vehicle; determine, based on the second diagnostic code, whether the remedial action was performed within the timeframe; and determine, by the one or more computers, an incentive for the auto-insurance policy based on whether the remedial action was performed within the timeframe.

19. A system, comprising: an on-board diagnostic system of a vehicle; a computing device associated with the vehicle; a communication interface; at least one processor; and a memory storing computer-executable instructions that, when executed by the at least one processor, cause the system to: receive data comprising an identifier associated with a vehicle and a first diagnostic code generated by the on-board diagnostic system of the vehicle; identify, by the one or more computes and based on the identifier, an auto-insurance policy associated with the vehicle; determine, based on the diagnostic code generated by the on-board diagnostic system, an issue with the vehicle, a remedial action for addressing the issue, and a timeframe for performing the remedial action; communicate, via the communication interface and to the computing device, a notification identifying the issue, the remedial action, and the timeframe; receive a second diagnostic code generated by the on-board diagnostic system of the vehicle; determine based on the second diagnostic code whether the remedial action was performed within the timeframe; and modify, based on whether the remedial action was performed within the timeframe, an auto-insurance policy that includes coverage for the vehicle.

\* \* \* \* \*